United States Patent [19]

Cannon et al.

[11] 4,347,660

[45] Sep. 7, 1982

[54] QUICK CHANGE DRILL ASSEMBLY MACHINE

[75] Inventors: Michael R. Cannon, Redmond; Robert L. Fuller, Jr., Issaquah; Dwayne E. Proff, Puyallup, all of Wash.

[73] Assignee: The Boeing Company, Seattle, Wash.

[21] Appl. No.: 192,237

[22] Filed: Sep. 30, 1980

[51] Int. Cl.³ .............................................. B23P 11/00
[52] U.S. Cl. ...................................... 29/790; 29/469; 29/525; 29/759; 29/809
[58] Field of Search ................. 29/469, 525, 759, 809, 29/790, 787, 791

[56] References Cited

U.S. PATENT DOCUMENTS

| | | |
|---|---|---|
| 2,604,692 | 7/1952 | Broden . |
| 2,836,218 | 5/1958 | Perri . |
| 3,054,170 | 9/1962 | Benichasa et al. . |
| 3,086,573 | 4/1963 | Adams . |
| 3,180,014 | 4/1965 | Maximoff ............................ 29/790 |
| 3,191,279 | 6/1965 | Ashurkoff . |
| 3,222,767 | 12/1965 | Ashurkoff et al. . |
| 3,266,132 | 8/1966 | Wideburg et al. . |
| 3,501,826 | 3/1970 | Marcus . |
| 3,606,661 | 9/1971 | Schoepe et al. . |
| 3,921,281 | 11/1975 | Hattori et al. . |
| 3,995,361 | 12/1976 | Scheller et al. . |
| 4,057,882 | 11/1977 | Bowmer . |

Primary Examiner—Leon Gilden

Attorney, Agent, or Firm—Delbert J. Barnard; Eugene O. Heberer; Joan H. Pauly

[57] ABSTRACT

A method and machine for making a quick change drill assembly that can be snapped into and out of a spring-loaded ball-locking chuck. The assemblies are comprised of standard sized adapters having various sized bores to receive drills having shanks of corresponding interference-fit diameters. Adapters and drills are fed from opposite ends of the machine to positions from which they are interference fit and automatically discharged. The adapters are fed into a storage tube from a feeder bowl and in the storage tube they are selected or rejected according to the direction of the bore. Selected adapters are air driven to a magazine in a retracted position and from which it is movable to a supplying position. In the supplying position the individual adapter is forced into a radially biasing collet in a hydraulic press. The drills are dropped from a hopper into a slot-bar from which they are pushed into a drill collet in alignment with the adapter collet, the drill being held in the collet by a hydraulic clamping mechanism. The drill shank extends outwardly of the collet toward the bore in the adapter and the adapter is then carried in its collet by a hydraulic ram to be interference fit on the end of the drill shank. The drill is then released in its collet and the adapter collet is retracted to withdraw the drill, secured to the adapter, from the drill collet. The assembly is then pushed out of the adapter collet by a hydraulically operated piston so as to fall into a collecting bin.

16 Claims, 20 Drawing Figures

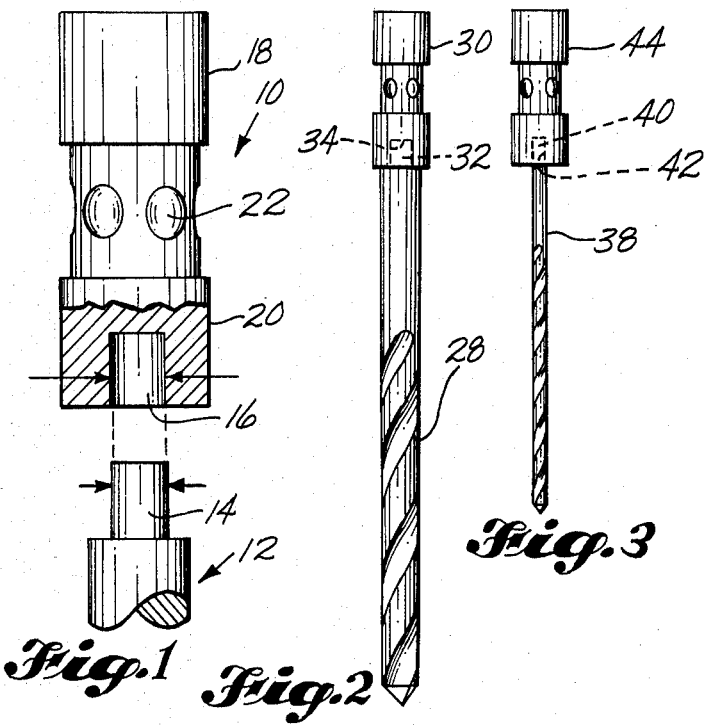
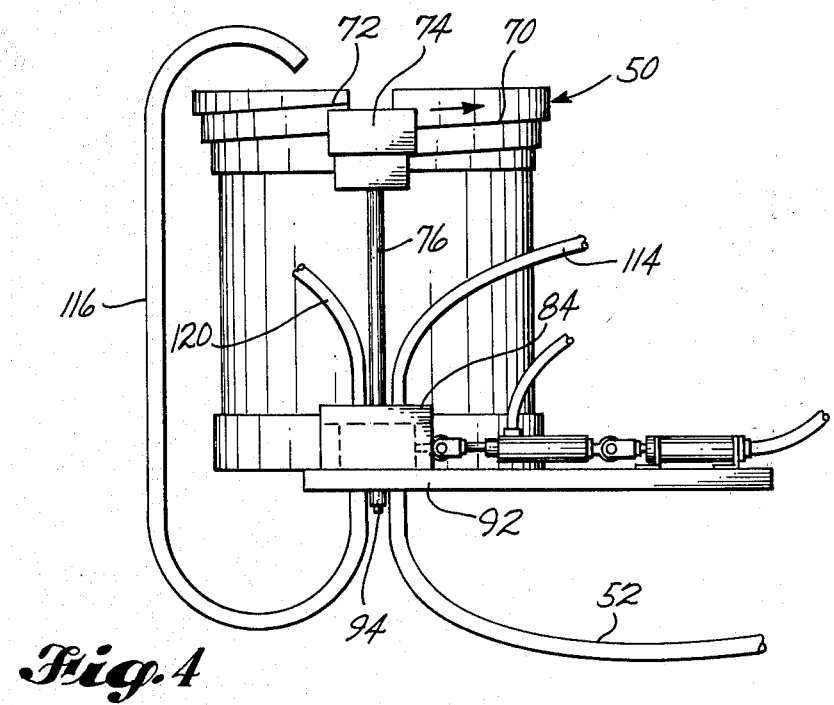

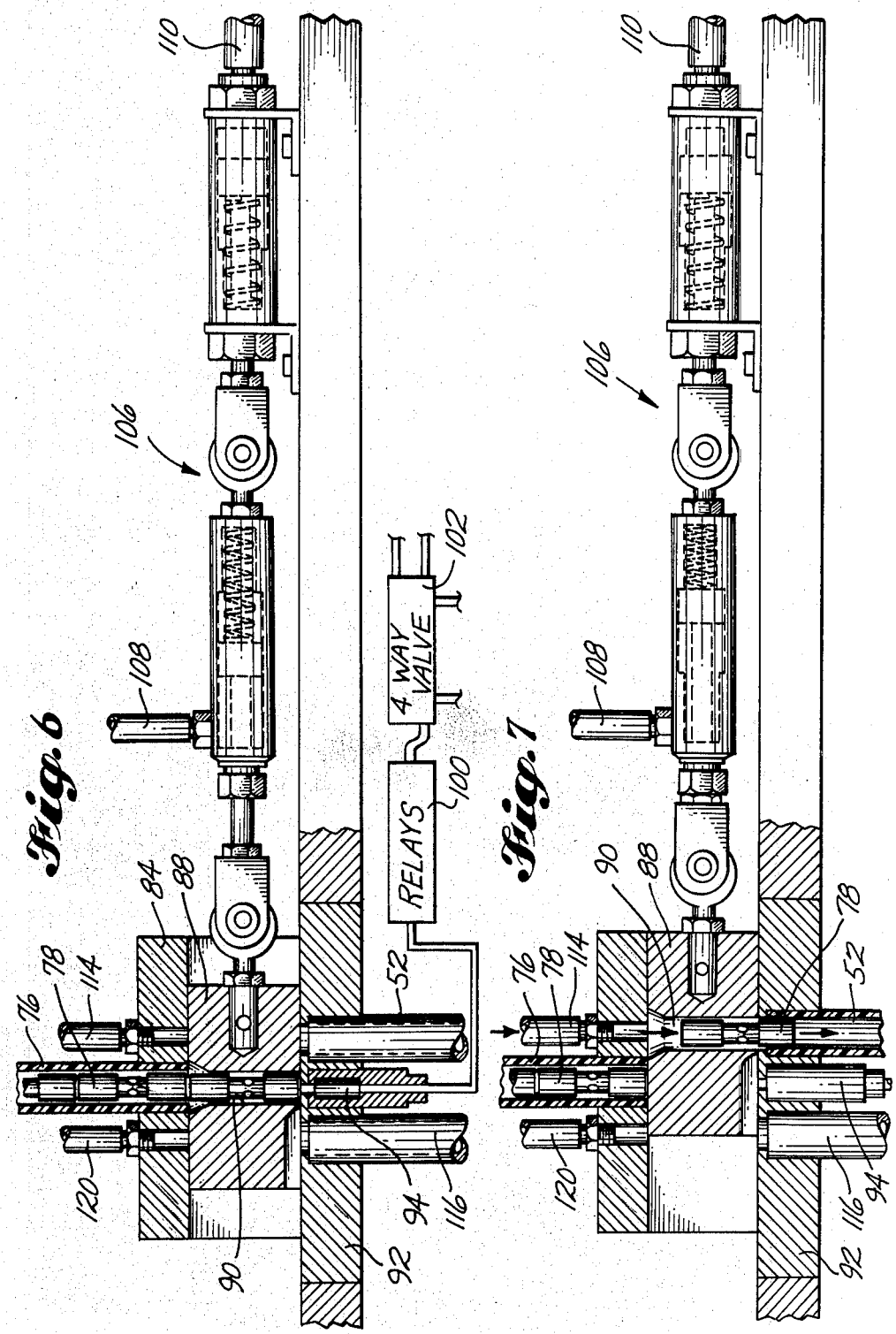

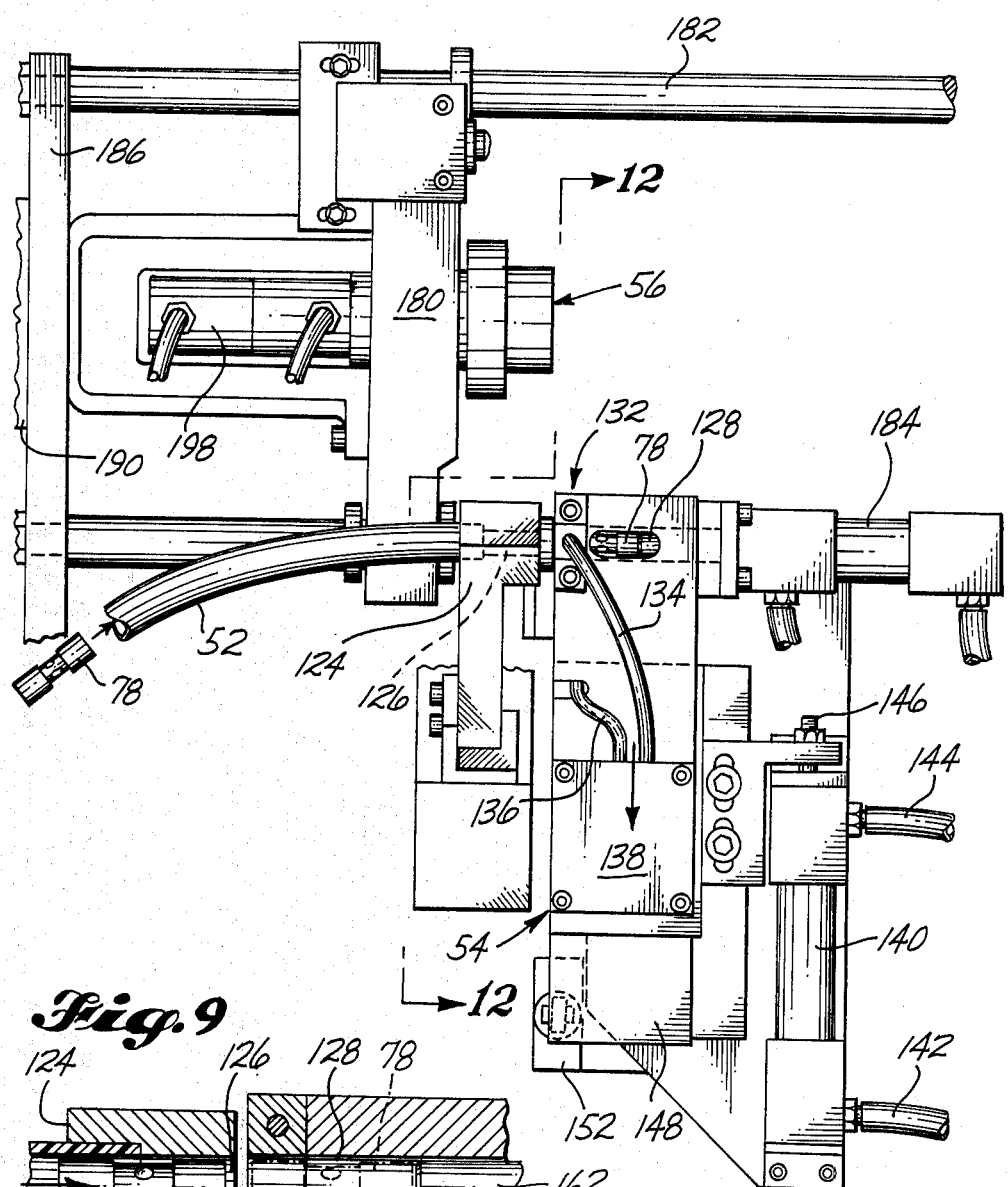
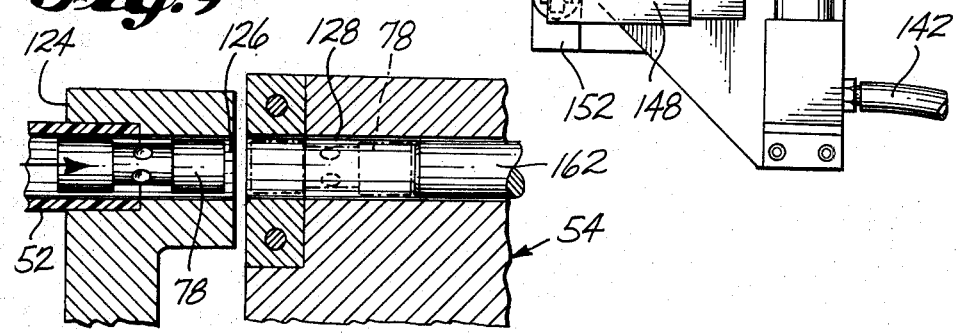

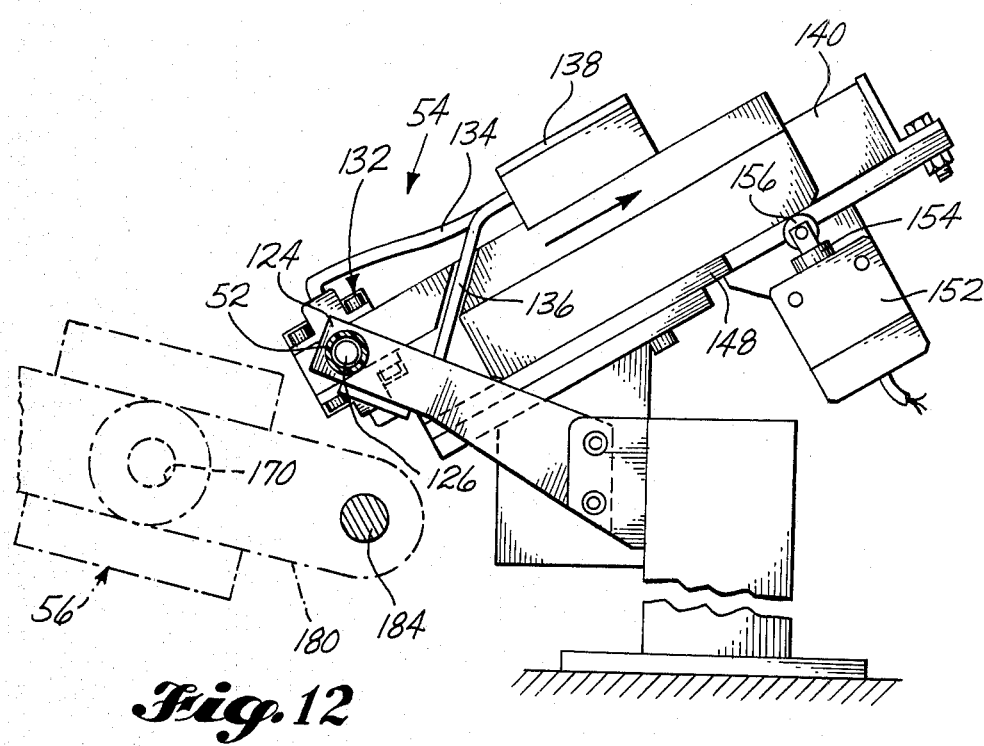
*Fig.*12
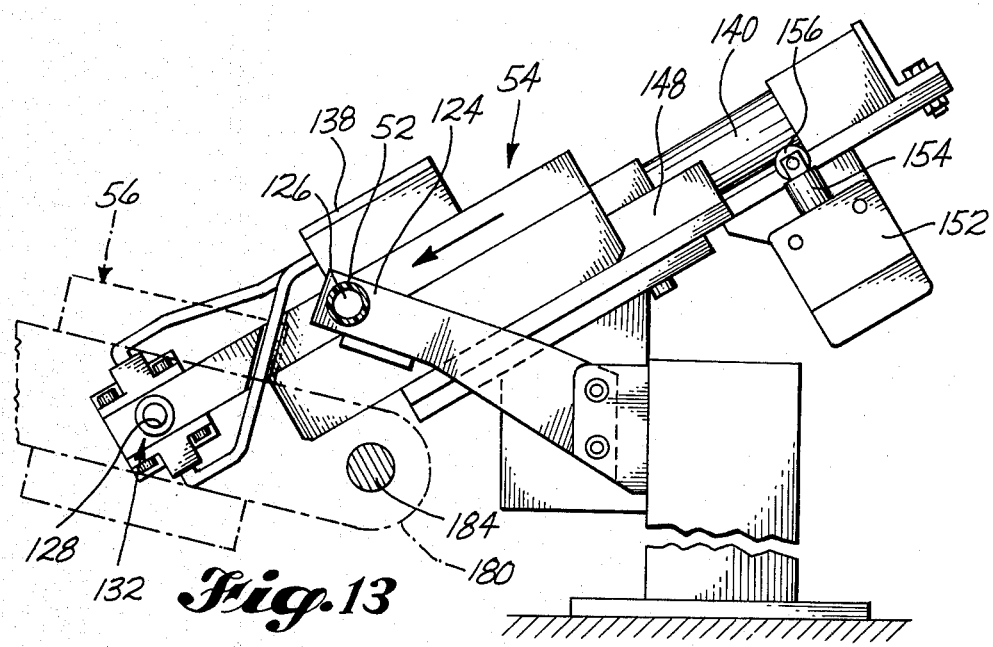
*Fig.*13

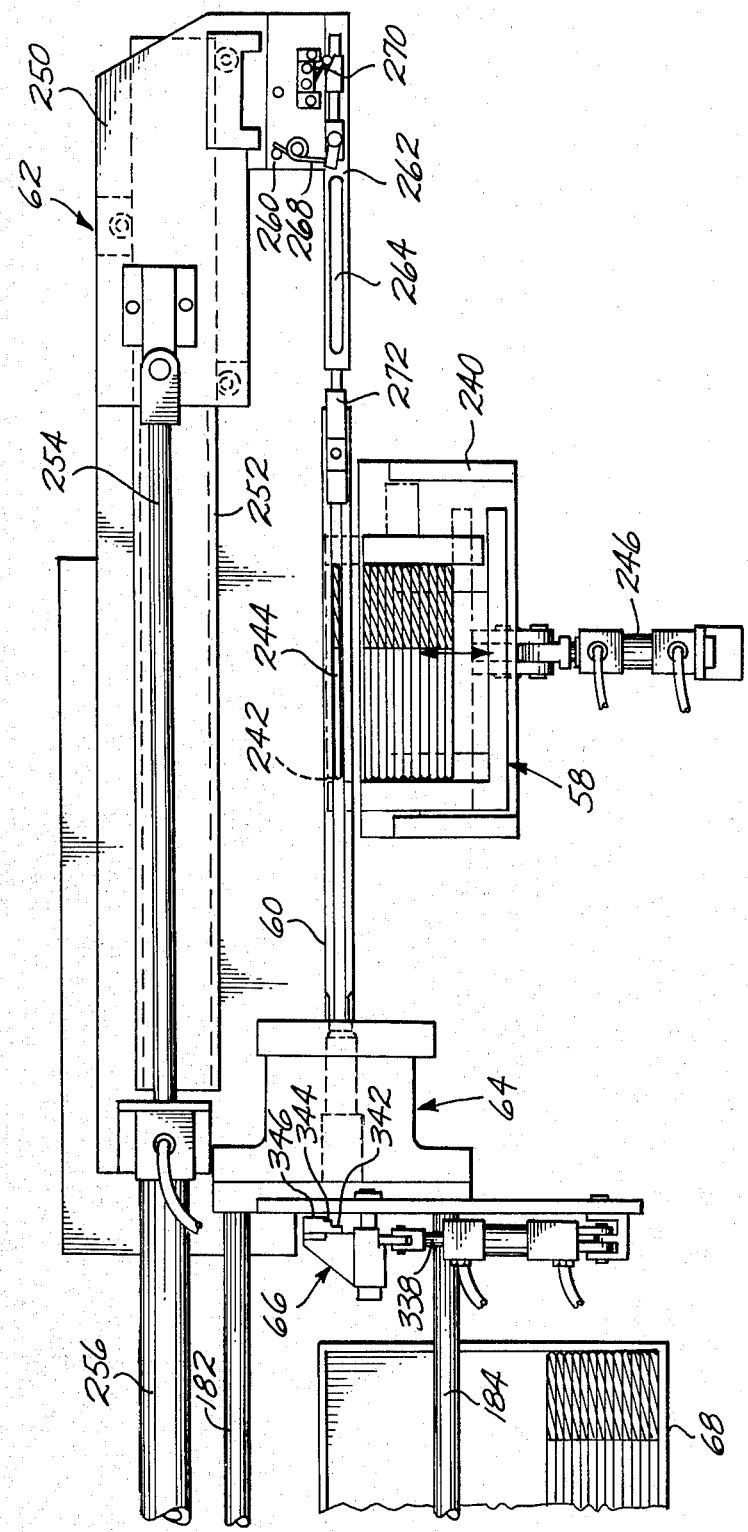

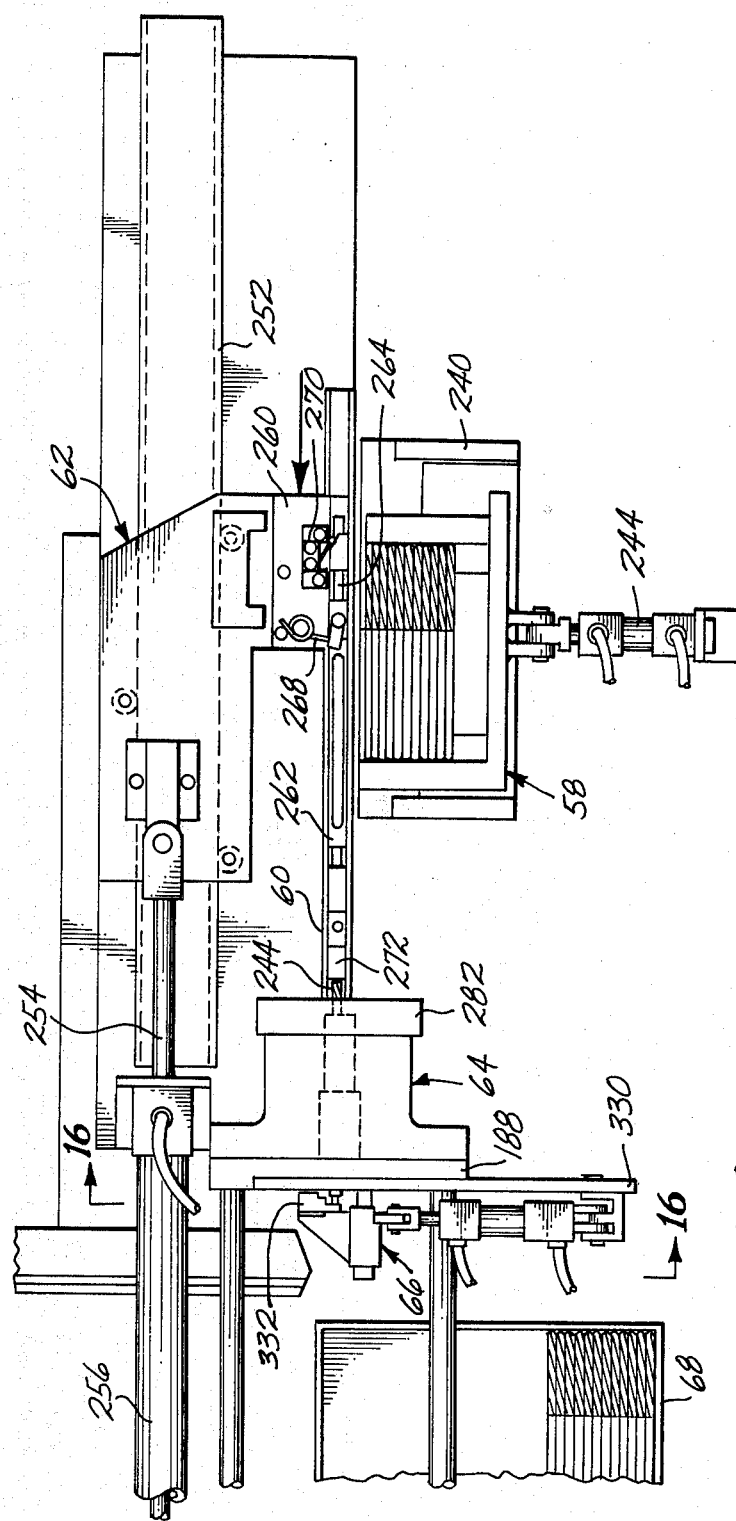

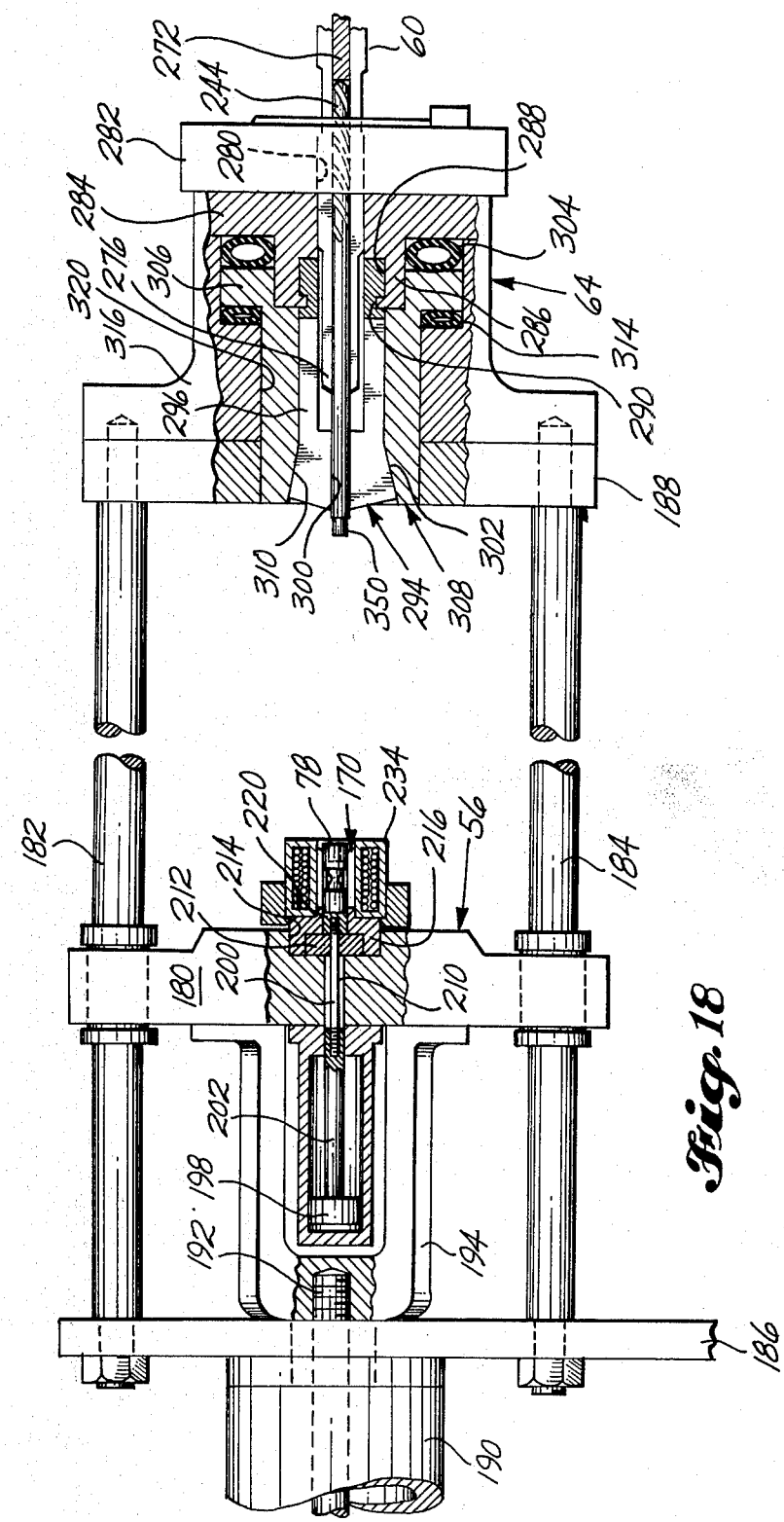

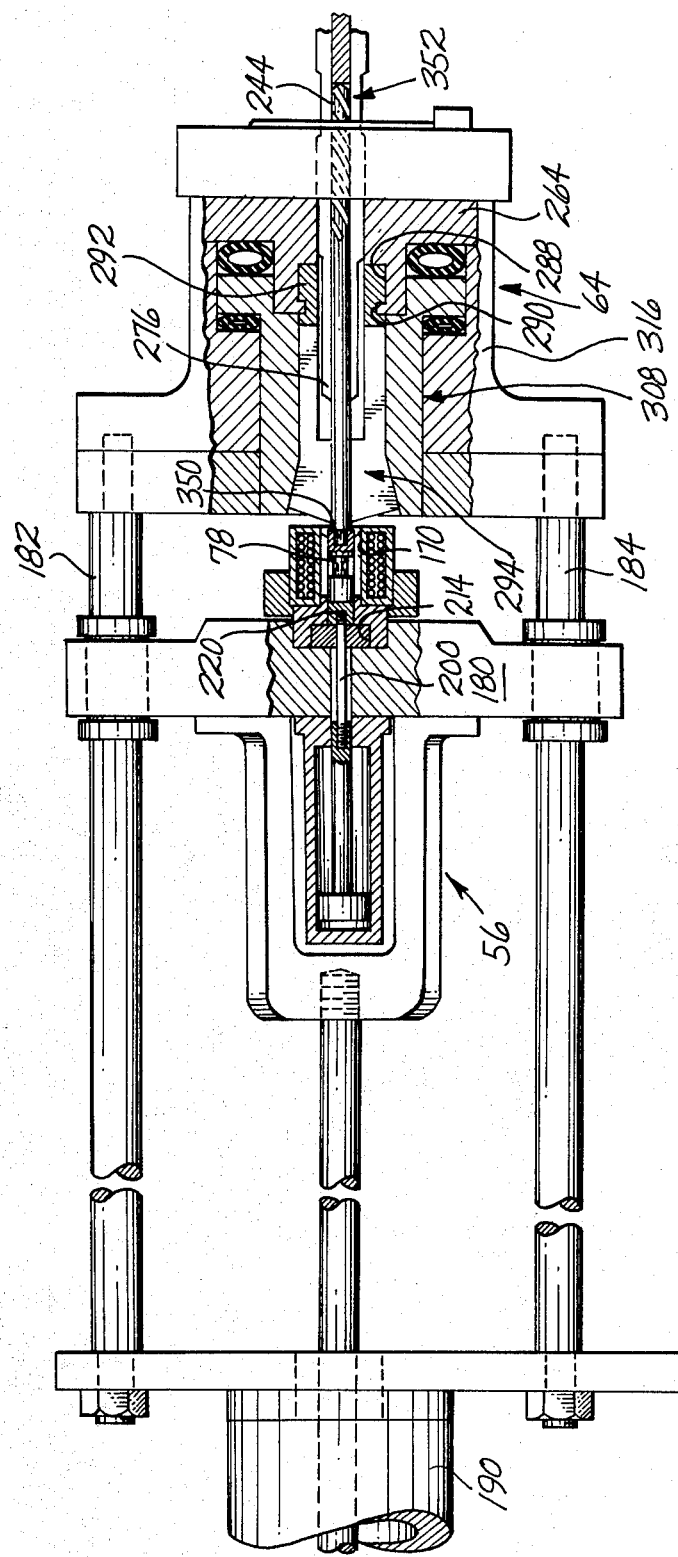

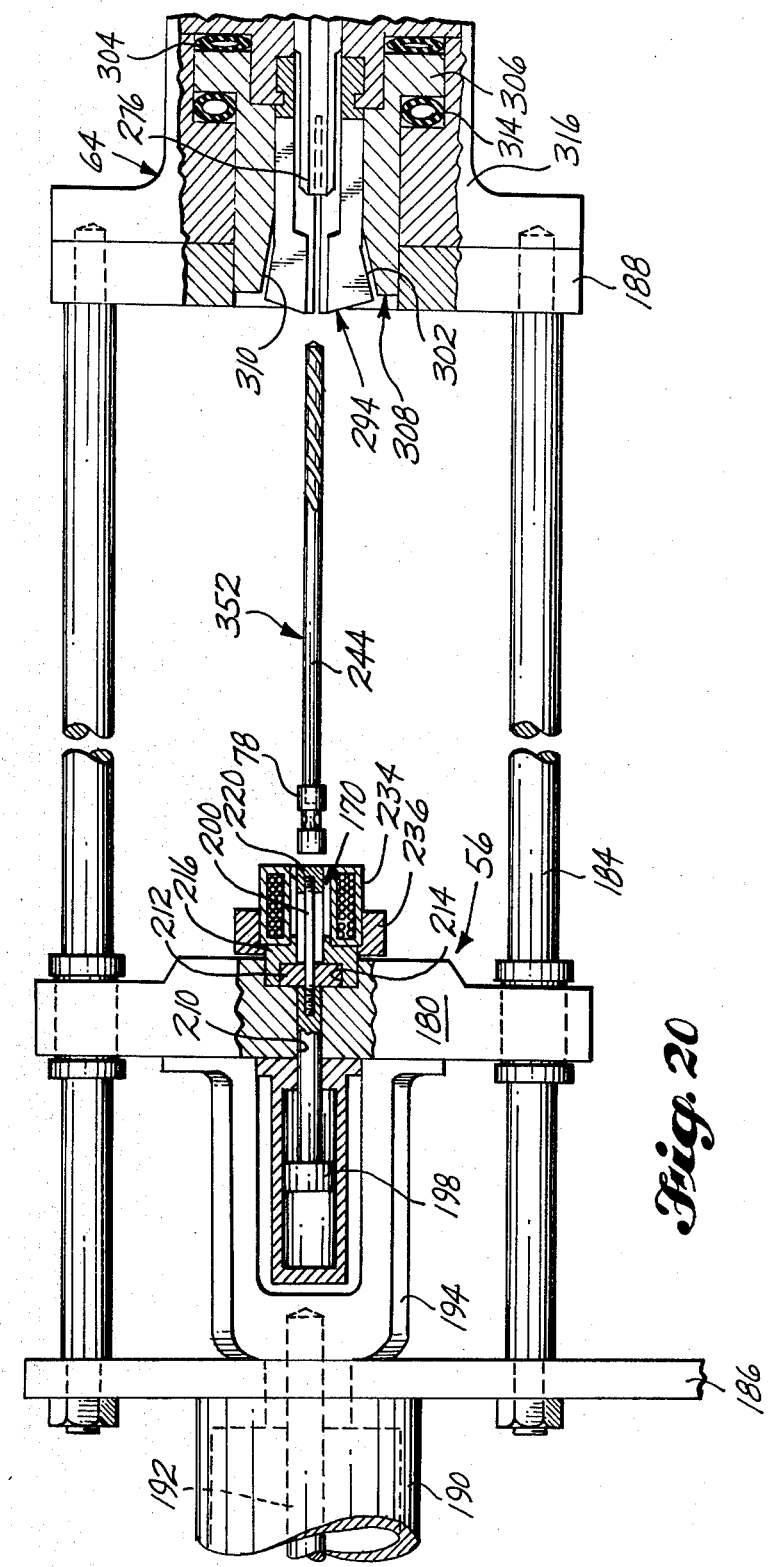

QUICK CHANGE DRILL ASSEMBLY MACHINE

BACKGROUND OF THE INVENTION

In situations where power drill operators drill a great number of holes, such as in aircraft manufacture, the drills must be frequently changed because of dullness or because of requirement for a different size. Standard power drills have Jacobs-type chucks which require the operator to loosen and tighten the chuck every time a used drill is removed and a new drill is inserted. Needless to say, when multiple holes are being drilled by an operator, this type of drill changing which is frequent during a day, consumes an inordinate amount of time.

In the prior art, quick change drills have been manufactured by a brazing an adapter to each drill and then finishing the assembly by multiple grind operations to make the adapter concentric with the drill. This method has the disadvantage of being very expensive. It requires a high initial cost for the brazing apparatus and grinding equipment so as to limit producers of this type to drill manufacturers that have elaborate brazing and grinding facilities. When this equipment is available, the products are expensive.

SUMMARY OF THE INVENTION

The present invention produces a quick change drill assembly which is comprised of a standard size, generally cylindrical adapter having a drill interference fit therein. A selected standard size adapter accommodates a plurality of drill sizes, for example, No. 40, ⅛ inch, No. 30, No. 20, 3/16 inch, No. 10, 7/32 inch, ¼ inch, and F. The adapters for these drills have four bore sizes and the drill shanks that fit into the bores are reduced in diameter as needed to properly fit into a selected bore size. After assembly, the adapters are ground so as to be concentric with the drills therein. The adapters are sized to fit into a standard snap-fit chuck having a central bore into which spring-loaded balls extend radially, the balls gripping the adapter by extending into recesses in the adapter circumference which are complementary to the balls in the chuck.

The quick change drill assembly machine, according to the invention, is a fully automatic machine tool that converts straight shank, general purpose drills into the above described quick change drill assemblies. The machine is hydraulically powered, and relay controlled so to be capable of automatically feeding quick change adapters and drills to a press station to effect an interference fit joining operation. The machine is automatically sequenced through sequencialcycle sensing, and switching using sensors, limit switches, relays, hydraulic and pneumatic valves.

Accordingly, it is an object of the invention to provide an improved quick change drill assembly machine and method which produce relatively inexpensive and improved quick change drills.

It is another object of the invention to provide a machine and method which produce quick change drill assemblies that save a substantial amount of time and expense in the operation of powered hand drills that are in continuous or substantially continuous use. In such operations, drills have to be frequently changed, and the capability of the operator to snap out a drill from a standard chuck and then snap another drill into the same chuck, without loosening and tightening the chuck with a wrench, saves a significant amount of time and cost of operation.

It is still another object of the invention to provide a quick change drill assembly machine which produces approximately 600 quick change drills per hour.

It is a further object of the invention to provide a machine, as described in the preceeding paragraphs, which stores large quantities of drills and adapters in feeder hoppers from which a drill and adapter are automatically selected, places the parts in correct orientation for mating, conveys the parts to an assembly function mechanism, press assembles the adapter and drill together to form a high-torque-resistive assembly, retracts, and then ejects the drill-adapter assembly into a collection container.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 1 is an enlarged fragmentary elevational view of a quick change drill assembly made by a machine according to the invention;

FIG. 2 is an elevational view of quick change drill assembly, illustrating the employment of a relatively large drill with a standard adapter;

FIG. 3 is an elevational view of a quick change drill assembly, illustrating the employment of a small drill in a standard adapter;

FIG. 4 is a fragmentary elevational view of an adapter feed system, illustrating the accept and reject paths of the adapters from an adapter feed bowl;

FIG. 6 is an elevational partially cross-sectional view of a part of the feed system, illustrating the feed sensing-selecting process of the adapters;

FIG. 7 is a view similar to FIG. 6, illustrating the selection of an adapter to be fed to the machine;

FIG. 8 is a fragmentary plan view, including an adapter being fed to a magazine for a hydraulic press, the magazine being in a retracted position;

FIG. 9 is a fragmentary cross-sectional view of the end of the adapter feed system, with an adapter in position to be fed into the magazine;

FIG. 12 is a fragmentary end view of the magazine, taken along the lines 12—12 in FIG. 8;

FIG. 13 is a fragmentary view of the magazine, taken along the lines 13—13 in FIG. 10;

FIG. 14 is a plan view of a drill feed system;

FIG. 15 is a view similar to FIG. 14, illustrating the position of the drill in a drill collet and against a drill stop;

FIG. 18 is a detailed plan view of the hydraulic press having an adapter in its collet and in position to carry the adapter to interference fit it onto the drill in the drill collet;

FIG. 19 is a view similar to FIG. 18 after the adapter has been interference fit on the end of the shank of the drill; and FIG. 20 is a plan view of the press and drill collet after the drill has been withdrawn from the drill collet and the adapter, as assembled to the drill, has been ejected from the hydraulic press collet for dropping into a collection bin.

DESCRIPTION OF THE PREFERRED EMBODIMENTS

Figure 5:
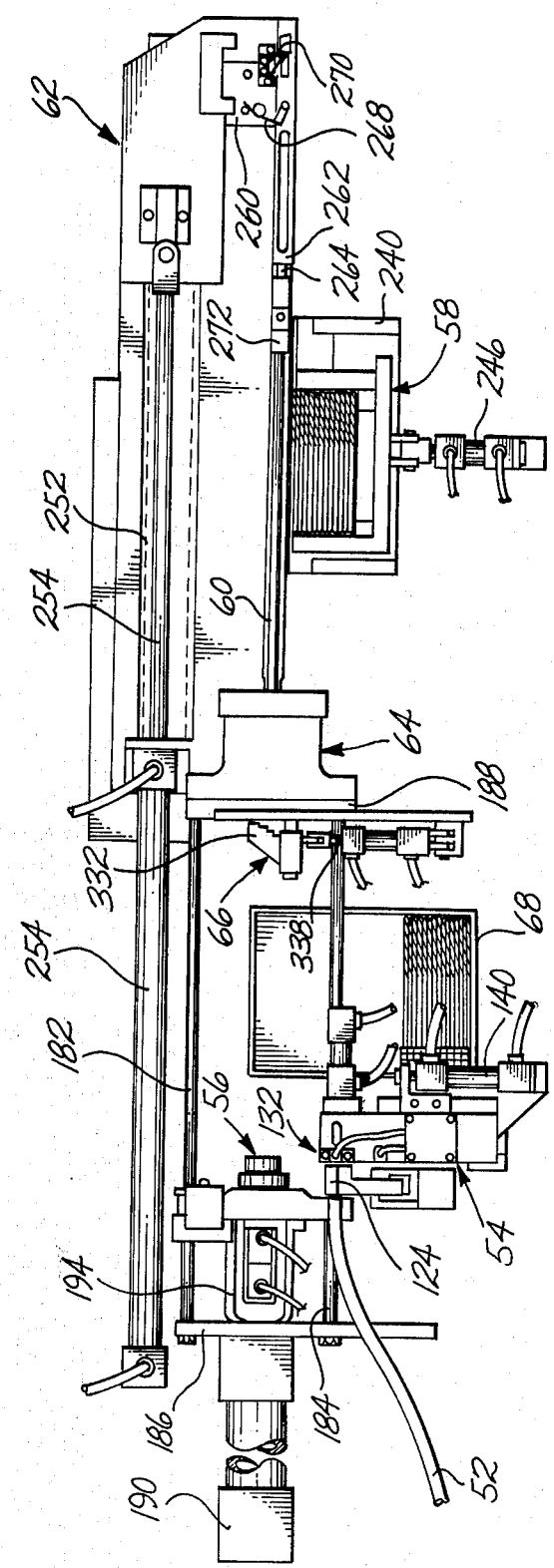
FIG. 5 is a plan view layout of the machine according to the invention, which is fed from the feed bowl as shown in FIG. 4.

Referring again to the drawings, there are shown in FIGS. 1–3 quick change drill assemblies fabricated by the invention. In FIG. 1 there is a generally cylindrical adapter 10 and a drill 12 having its shank end 14 reduced in diameter by being ground for interference fit into a bore 16 in one end of the adapter 10.

The adapter has two large diameter cylindrical portions 18 and 20 which are ground to make the adapter concentric with the drill after the drill is interference fit therein. In the central portion of the external cylindrical surface of the adapter, there are a series of circumferentially spaced semispherical-shaped recesses 22, adapted to receive spring-held, locking-balls of a standard quick change drill chuck.

In FIGS. 2 and 3, there are examples of large and small size drills, interference fit into standard adapters. A large drill 28 has been assembled into a standard adapter 30, the drill having a ground down shank end 32 interference fit into a bore 34. A small drill 38 has a shank end 40 which was small enough so that grinding was not necessary for fitting into a small diameter bore 42 in an adapter 44.

The principal elements of the inventive quick change drill assembly machine are shown in FIGS. 4 and 5. They include an adapter feed bowl 50 and a selected adapter feed line 52 in FIG. 4. The feed line continues into FIG. 5, terminating at a magazine 54 in its retracted position. It is adapted to move to a supply position to supply an adapter into hydraulic press 56. At the right end of FIG. 5, there is a reciprocally movable drill hopper 58 in its retracted position and it is adapted to be moved over a drill track or slot-bar 60 to drop a drill therein. Supported on the end of the machine is a drill pushing assembly 62 which moves drills in the track 60 into a drill collet assembly 64. At the left of the collet assembly 64, there is a drill stop 66, shown in a stopping position. In operation, the drill press 56 is moved to the right to interference fit an adapter on the shank end of a drill and then retracted to discharge the quick change drill assembly into a collection bin 68. All elements are supported on a main frame of the machine, not shown in detail.

The machine is operated automatically and every step is sequenced by devices that provide electrical signals to relays which actuate hydraulic or pneumatic apparatus.

Now, considering the machine in detail, the adapters are selected for specific drills. Because the adapters are identical externally, no adjustments or changes are required in the part of the machine handling them. The adapters are fed into the feeder bowl 50 from a vibratory hopper, not shown. The bowl 50, which is conventional, rotates counterclockwise and the adapters are collected on a continuous spiral shoulder within the bowl, indicated by the spiral lines 70 which terminate at the end 72 where the adapters are individually dropped into a small bin 74 and then into a storage tube 76, FIGS. 6 and 7. Here, the adapters 78 are held and moved intermittently.

The tube 76 terminates in a plate 84 in an adapter selector sensing and shuttling device which accepts and rejects adapters for the machine. The shuttling valve 88 has a central bore 90 normally positioned at the bottom of the tube 76 as shown in FIG. 6, permitting an adapter to drop into the bore. At the bottom of the bore in plate 92, there is a proximity sensor 94 producing eddy currents to sense whether the adapter bore is extending downwardly or upwardly. If the bore is extending downwardly, the sensor sends a signal to a relay in a box 100 so as to cause a four way air valve 102 to operate a double air piston actuator 106 through air hoses 108 and 110 so as to move the shuttle 88 to the right and allow an adapter 78 to enter the feed tube 52, FIG. 7. At the same time the four way valve directs a flow of air into tube 114 which is communication with the bore 90 and the tube 52.

If an adapter 78 has its solid end downwardly, the signal is such to actuate the relay to cause the double piston actuator 106 to move the shuttle 88 to the left to permit the rejected adapter to enter tube 116 and a blast of air enters the tube 120 to cause the adapter to return to the feed bowl 50, FIG. 4.

As shown in FIGS. 5, 8, 9, 12 and 13, the adapter 78 travels in the tube 52 to a fixed block 124 in which the tube terminates in alignment with a bore 126. The bore 126 is in alignment with a bore 128 in the magazine 54 when it is in its retracted position. The magazine receives just one adapter 78 for delivery to the hydraulic press 56. The presence of the adapter in the magazine is indicated by an air sensor 132, having two hoses 134 and 136 which supply air to the sensor, and when the adapter enters the bore 128, the airflow is reduced so as to cause an electrical signal to be sent from the box 138 to relays in the box 100, FIG. 6. The relays actuate a hydraulic source, not shown, which causes fluid to flow in the hoses 142 and 144 in the appropriate directions to move the piston and its rod 146 and the magazine 54 connected thereto into its press supplying position, FIGS. 10, 11 and 13. The sensor 132 could be a photodiode, for example.

A switch box 152 having a spring biased plunger 154 with a roller 156 on its end is secured to the under side of the magazine carriage. This is a limit switch typical of the type that is used on all hydraulically operated mechanisms in the machine. This switch sends a signal to the relay box indicating that the magazine has moved from its retracted position and also indicates when the magazine has returned to its retracted position. The system is sequenced so that the next proper actuation of a moving part will not occur until each device has been moved and properly returned so that the next device can be actuated.

Figure 10:
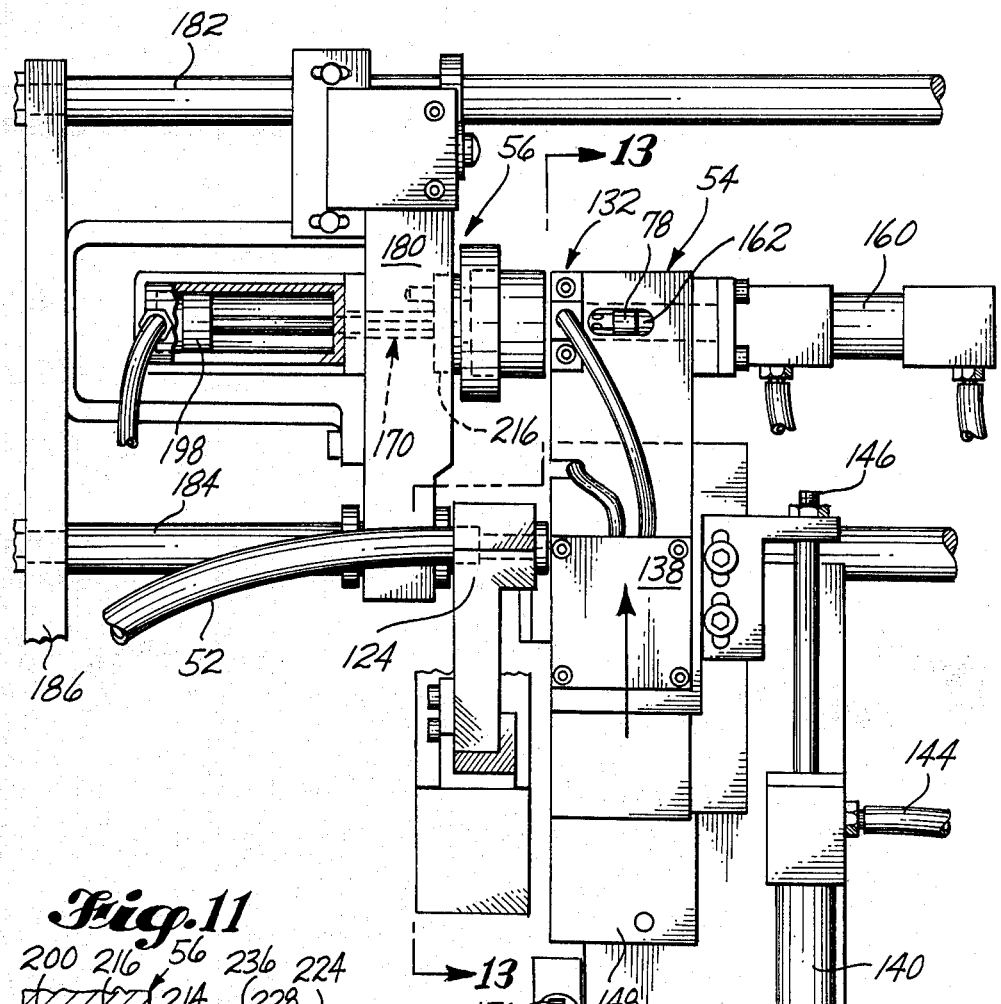
FIG. 10 is a view similar to FIG. 8 with the magazine in a supply position for delivering an adapter to the hydraulic press.
Figure 11:
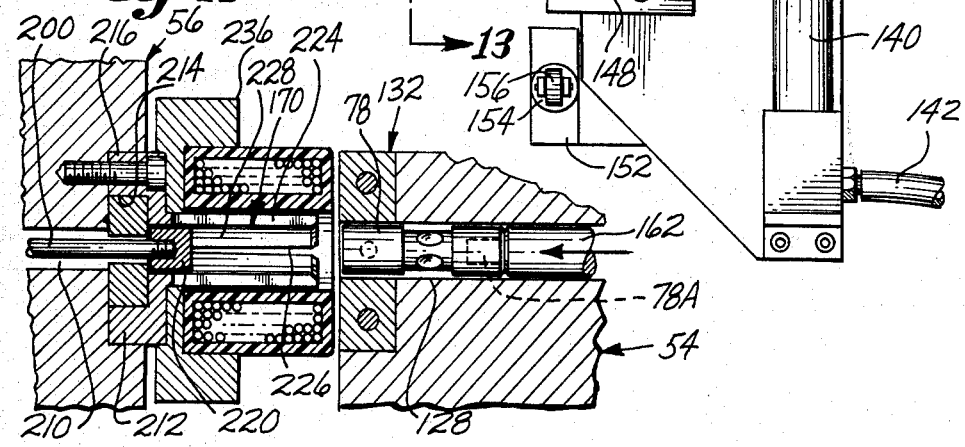
FIG. 11 is a fragmentary view showing the details of the magazine and adapter holding collet in the press, with an adapter in position for being fed into the press collet.

As shown in FIGS. 10, 11 and 13, the magazine is in position so that hydraulic piston 160 is actuated, by means of a switch, not shown, by relays, at the end of the downward movement of the magazine. A rod 162 in the bore 128 is connected to the piston 160 to move the adapter 78 into a radially biasing collet 170 in the hydraulic press 56. The adapter 78 has its bore 78A in the correct direction to be assembled on a drill, FIG. 11. After the rod 162 has moved the adapter into the collet 170, the piston 160 is reversed and the rod withdrawn to empty the bore 128 so that the sensor detects an increase in airflow through the tubes 134 and 136. This provides a signal to indicate that the magazine 54 is ready to be withdrawn by action of the piston 140. When the magazine is returned to the retracted position, it then is ready to receive the next adapter.

As shown in FIGS. 5, 8, 10–18 and 18–20 the hydraulic press 56 is supported by a yoke 180, bearing mounted at its ends for reciprocation on structural rods 182 and 184. The rods are supported at their ends on plates 186 and 188 which are supported on the main frame, not shown. The plate 188 also supports the drill collet assembly 64.

A hydraulic ram 190, secured to the plate 186, functions to reciprocate hydraulic press 56 by means of its rod 192, having its end threadedly engaged in a bell portion 194 of the press.

The bell 194 contains a hydraulically operated piston 198 having an extension 200 on its rod 202, FIGS. 11 and 18–20, in a bore 210 in the yoke 180 and the inward end of the collet 170. Rod 210 is slidably engaged in a cylindrical member 212 which is fitted in a cylindrical recess 214 in a collet support flange 216. The flange 216 is bolted to the yoke, FIG. 11, to secure the collet and the member 212 thereto. A cylindrical plunger 220 is threadedly engaged on the end of the rod 200 within the collet.

As best seen in FIG. 11, the collet 170 has four axially directed fingers 224, separated by circumferentially spaced slots 226. The internal surfaces 228 of the fingers are generally conical so as to form diminishing interrupted circular cross sections toward the open end. The adapter 78 has a larger diameter than the open end of the collet so as to force the fingers outwardly as the adapter is moved inwardly to the position shown in FIGS. 18 and 19. This requires that considerable force be applied on the adapter as it enters the collet, and thus, the collet exerts a considerable radial bias on the adapter after it is therein.

Secured around the spring collet 170 is an electromagnetic coil 234, supported on a coil adapter 236 secured to the flange 216. The coil 234 is energized every time the press is reciprocated to magnetize the adapter in the collet so that if the adapter happens to be in the wrong direction, the magnetized adapter will draw the drill out of the drill collet and then drop the drill into a collection bin 68. The adapter will be forced out of the spring in the usual manner without a drill attached.

In FIGS. 5, 14–20 the drill feed and travel are illustrated. The drill hopper 58 is supported for reciprocation on a frame 240. The hopper is generally rectangular having a bottom sloping toward the drill slot-bar on track 60 and is adjustable to receive drills of different sizes, with the fluted ends to the right. It has a drill slot 242, FIG. 14, at its forward end which is positioned over the track 60 to drop a single drill, as 244, into the track when the hopper is actuated by a hydraulic piston 246. The piston produces a quick in and out movement of the hopper to feed a drill into the track in sequence relative to the feeding of an adapter into the press 56. The track has a depth sufficient to hold the drill therein during movement.

The drill pushing mechanism 62 is comprised of a plate 250, carried for reciprocal movement on a track 252 which is supported on the main frame. A hydraulic piston rod 254 has one end secured to the plate 250 and has its other end secured to a hydraulic piston 256. A plate 260 is hingedly mounted to the plate 250 and has fixed thereon a drill pushing rod support tube 262. A pushing rod 264 is slidably engaged in the tube 262. The rod 264 is normally biased to the left with respect to the tube 262 by means of a coil spring 268. At the right end of the rod there is a normally open limit switch 270. A dril pusher 272 is secured to the left end of the rod 264 and is slidably engaged in the track 60 to make moving contact with the sharp end of the drill.

Figure 16:
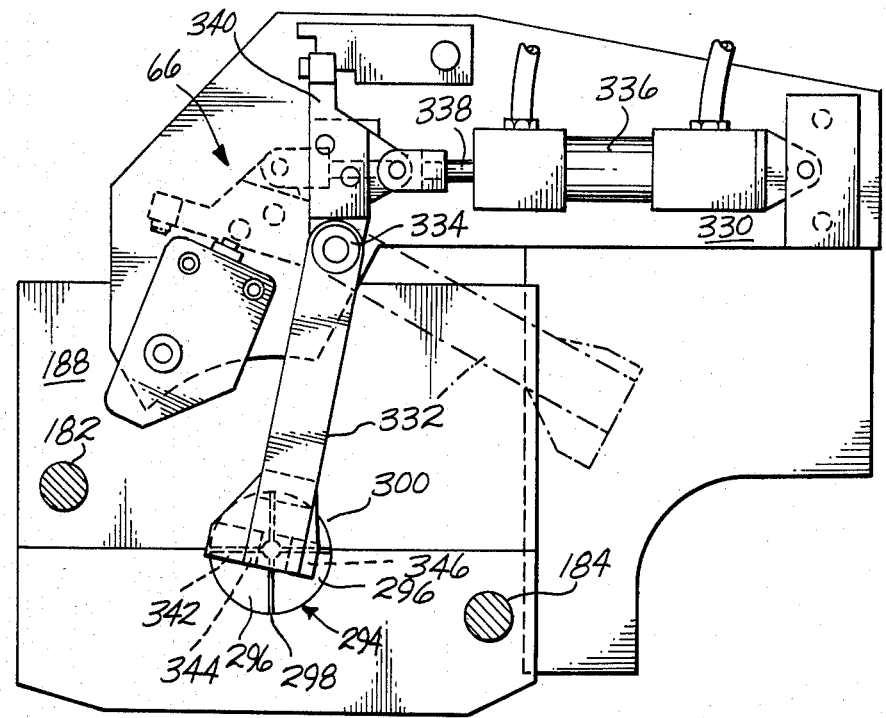
FIG. 16 is an end view of the drill collet and the drill stop, taken along the lines 16—16 in FIG. 15.
Figure 17:
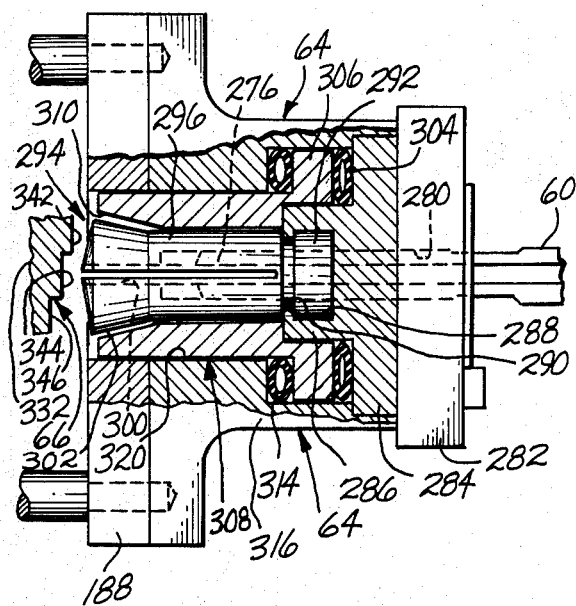
FIG. 17 is a view of an empty drill collet and a fragmentary cross-sectional view of the drill stop.

As shown in FIGS. 17–20, the left end 276 of the track 60 extends into a generally cylindrical opening 280 in the drill collet assembly 64. Inwardly of the plate 282, there is a fixed collet support plate 284, and extending therefrom is a small diameter portion 286, having a recess 288 terminating in an opening having an annular flange 290 extending therein. The plate 284 is formed of a plurality of members so as to be fittable on a cylindrical end portion 292 of a fixed drill collet 294. As best seen in FIGS. 16 and 17, the collet, extending beyond the inner portion 292, is formed of four quadrant portions 296, separated by axially directed slots 298. It has a central bore 300 in alignment with the drill track 60 to receive a drill 244 therefrom, FIG. 18. Outwardly diverging conical surfaces 302 are adjacent the collet outer end.

An annular inflatable tube 304, connected to a hydraulic source, not shown, is in abutment with a radial surface of the flange 284. Outwardly of the portion 286 is an annular flange 306 of an axially movable clamping member 308 in abutment with the tube 304. A generally cylindrical portion extends from the flange 304, and has an inner cylindrical surface complementary to the outer cylindrical surface of the collet. Similarly, the conical surfaces 302 of the collet are complementary to the conical surface 310 of the clamping member.

A second annular inflatable tube 314 is connected to a hydraulic source, not shown, and is spaced between the flange 306, an outer generally cylindrical housing member 316, and an inner cylindrical bore 320 surrounding the clamping member 308.

As best seen in FIGS. 5 and 14–17, the drill stop mechanism 66 is secured on a plate 330 extending from the plate 188. The drill stop is an arm 332 pivotal at 334 from a stop position, to an upwardly withdrawn position, shown in phantom outline in FIG. 16. A hydraulically operated piston 336 has a piston rod 338, pivotally connected to a lever 340 adapted to swing the arm from the stopping position to the withdrawn position. The drill stop piston 336 is actuated to move the stop in front of the collet when the drill is dropped from the hopper into the slot 60, the stop being in position as the drill is being moved against it by the movement of the pushing apparatus 62. The stop 332 is adjustable and has three stopping surfaces 342, 344 and 346, FIG. 17. They are positioned according to the drill length by changing the connections between the lever 340 and the piston rod 338.

As shown in FIG. 15, when the drill has been moved into the open collet against the stop, the pusher 272 being against the sharpened point, the spring 266 releases the force of the pusher against the drill by permitting the rod 264 to move in the direction away from the drill so as to prevent damage to the sharpened point. At the same time the normally opened switch 270 is closed by the rod as it moves against the force of the spring to the right to indicate that the travel of the pusher to the left has been completed and is in position to be reversed.

At the same time, FIG. 18, hydraulic pressure is directed into the tube 304 in the drill collet assembly to expand it so as to move the flange 306 axially so that the surface 310 of the clamping member 308 makes contact with the conical surfaces 302 on the four quadrant members of the drill collet. This forces the surfaces of the bore 300 into gripping contact with the drill shank and secures it in place against movement by the drill press. As the drill clamp closes, both the drill stop and the drill pusher return to their retracted positions.

At this time the adapter 78 and the drill 244 and its reduced diameter shank end 350 are in position for assembly. The hydraulic ram 190 is then actuated to move the press 56 from the position shown in FIG. 18 to that shown in FIG. 19 where the bore of the adapter has been moved onto the shank end 350 of the drill. By electrical signal the hydraulic pressure is then released from the tube 304 and pumped into the tube 314, to move the conical surface 310 off of the conical surfaces 302 of the collet to release the drill therein. The movement of the clamping member 308 is about 0.020" between the tightened and the loosened positions thereof. A plate having a conical opening to fit on the surfaces 302 of the collet could also be used as a clamping member.

After the drill 244 has been released, the ram 190 retracts the press 56 and the quick change drill assembly 352 is drawn to the position of the adapter in FIG. 18. At this point the assembly is ready for release and hydraulic pressure is applied to the piston 198 in the bell 194 to move the plunger 220 against the adapter 78 to discharge the assembly 352 from the collet 170. The assembly then drops into the collection bin 68 and one cycle has been completed.

To prepare the machine for different drill sizes the operator must install the appropriate slot bar 60, drill pusher 272, drill collet 294 and reset the drill stop surfaces 342–346 as needed. A drill hopper length and height adjustment may have to be made according to the size of the drills.

The invention and its attendant advantages will be understood in the foregoing description and it will be apparent that various changes may be made in the form, construction, and arrangements of the parts of the invention without departing from the spirit and scope thereof or sacrificing its material advantages, the arrangements hereinbefore described being merely by way of example. We do not wish to be restricted to the specific forms shown or uses mentioned except as defined in the accompanying claims.

What is claimed is:

1. A quick change drill assembly machine, comprising:
   means for feeding individual adapters to an adapter magazine, each adapter having a bore in one end to be interference fit on the shank end of a drill;
   said magazine being reciprocally movable between a retracted position and an adapter supplying position;
   a reciprocally movable press for receiving an adapter from said magazine in said supplying position when said press is in a retracted position;
   means associated with said press for securing said adapter thereto with said bore in a predetermined position;
   drill feeding means for supplying individual drills to a drill holding collet with the shank end of the drill extending outwardly of said drill collet toward said adapter bore on said press and in axial alignment therewith;
   means for removably securing each drill in said drill collet; and
   hydraulic means for reciprocating said press between said retracted position and to adjacent said drill collet to respectively interference fit said secured adapter to said drill and withdraw the drill from the drill collet when assembled with the adapter.

2. The invention according to claim 1 including:
   adapter selector means associated with said means for feeding adapters to select adapters therein having their bores facing in a predetermined direction, and for rejecting adapters having their bores facing in the opposite direction.

3. The invention according to claim 1 including:
   sharpened drill end protection means associated with said drill feeding means to protect said sharpened ends as the drills are fed into said drill collet.

4. The invention according to claim 3 in which:
   said drill feeding means includes means for pushing drills into said drill collet;
   said means for pushing being associated with said protection means.

5. The invention according to claim 1 including:
   a drill stop associated with said drill feeding means to limit the movement of the drills in the drill collet toward the adapter bore.

6. The invention according to claim 2 in which:
   said adapter selector means includes a sensor for detecting the direction of the adapters and producing an electrical signal in accordance therewith; and
   pneumatic means actuated by said signal to direct an airflow in a path for selected adapters to said magazine, and to direct an airflow in a path for rejected adapters to an upstream portion of said means for feeding adapters;
   said airflows being adapted to move said adapters in said respective paths to said magazine and to said upstream portion.

7. The invention according to claim 6 in which:
   said adapter selector includes a reciprocally movable member associated with said pneumatic means and having a passage therethrough normally connected upstream to a gravity flow portion of said means for feeding adapters and normally connected downstream to said sensor;
   said member, when moved in one direction during reciprocation, being aligned with said airflow and path to said magazine, and when moved in the other direction during reciprocation, being aligned with said airflow and said path to said upstream portion.

8. The invention according to claim 7 including:
   said gravity flow portion being an adapter holding portion;
   said member being reciprocated after each sensor signal.

9. The invention according to claim 1 in which:
   said means associated with said press for securing said adapter thereto being a radially inwardly biasing adapter collect for securely gripping said adapter; and a reciprocally movable rod associated with said magazine for moving an adapter from said magazine into an open end of said biasing adapter collet.

10. The invention according to claim 9 in which:

said open end of said biasing adapter collet being directed toward said drill collet;

said adapter collet being formed of axially directed fingers having circumferentially spaced slots therebetween;

said fingers forming internal slot-interrupted circular cross sections diminishing in diameter toward said open end.

11. The invention according to claim 1 including:

means for ejecting said adapter from said press when said adapter and drill are assembled, said drill is withdrawn from said drill collet, and said press is retracted.

12. The invention according to claim 10 including:

hydraulic means for ejecting said adapter from said adapter collet on said press when said adapter and drill are assembled, said drill is withdrawn from said drill collet, and said press is retracted.

13. The invention according to claim 1 in which:

said drill feeding means includes a reciprocally movable drill hopper;

a drill track on one side of and in alignment with said drill collet and over which said drill hopper is adapted to reciprocate;

said drill hopper having a slot in its bottom to permit a drill to fall therethrough into said drill track when said drill hopper is reciprocated thereover.

14. The invention according to claim 13 including:

a reciprocally movable apparatus for moving individual drills in said track into and partially through said drill collet;

a drill stop on the other side of said collet from said track for limiting the movement of a drill in said collet;

said drill stop being pivotally associated with said drill collet so as to be moved into alignment with said drill collet when a drill is being moved in said drill collet;

said drill stop being adapted to be pivoted away from said drill collet when said apparatus is reciprocated away from said drill collet.

15. The invention according to claim 14 in which:

said apparatus includes a drill pusher reciprocal in said track in contact with the drill point to push the drill into the drill collet;

a rod support on said apparatus in alignment with said pusher in said track; and a rod connected to said pusher to reciprocate it with the apparatus, said rod being slidable within said support and spring biasing the pusher against said drill to release the pusher on said drill point when the drill makes contact with the drill stop.

16. The invention according to claim 15 in which:

said drill collet is generally cylindrical having an outwardly diverging conical end remote from the drill pusher;

said drill collet having axially directed, circumferentially spaced slots extending therethrough, said means for removably securing each drill in the drill collet being a reciprocally movable member having an internal configuration complementary to the external configuration of the drill collet, said last member being fitted on the drill collet to clamp the remote end when moved toward said end so as to secure the drill;

said last member being moved to clamp when said pusher is released on the drill point and the rod moves against the force of the spring and engages a switch to actuate means to reciprocate said last member.

* * * * *

UNITED STATES PATENT AND TRADEMARK OFFICE
CERTIFICATE OF CORRECTION

PATENT NO. : 4,347,660

DATED : September 7, 1982

INVENTOR(S) : Michael R. Cannon; Robert L. Fuller, Jr.; Dwayne E. Proff

It is certified that error appears in the above-identified patent and that said Letters Patent are hereby corrected as shown below:

Column 6, line 9, "dril" should be --drill--.

Column 8, second line from bottom (4th line of claim 9), "collect" should be --collet--.

Signed and Sealed this

Twenty-third Day of August 1983

[SEAL]

Attest:

Attesting Officer

GERALD J. MOSSINGHOFF

Commissioner of Patents and Trademarks